US011112783B2

(12) United States Patent
Hayzen et al.

(10) Patent No.: US 11,112,783 B2
(45) Date of Patent: Sep. 7, 2021

(54) METHOD AND APPARATUS FOR MACHINE MONITORING WITH CONTINUOUS IMPROVEMENT OF A PREDICTIVE MAINTENANCE DATABASE

(71) Applicant: Computational Systems, Inc., Knoxville, TN (US)

(72) Inventors: Anthony J. Hayzen, Knoxville, TN (US); Christopher G. Hilemon, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 56 days.

(21) Appl. No.: 16/663,716

(22) Filed: Oct. 25, 2019

(65) Prior Publication Data

US 2021/0124345 A1 Apr. 29, 2021

(51) Int. Cl.
*G05B 23/02* (2006.01)
*G01P 3/48* (2006.01)

(52) U.S. Cl.
CPC ............ *G05B 23/0283* (2013.01); *G01P 3/48* (2013.01)

(58) Field of Classification Search
CPC .............................. G05B 23/0283; G01P 3/48
See application file for complete search history.

(56) References Cited

U.S. PATENT DOCUMENTS

2016/0177856 A1* 6/2016 Martinez ............ F02D 41/1404
701/99

OTHER PUBLICATIONS

Emerson, AMS Machine Works Product Data Sheet, Jul. 2019, Copyright 2019, Emerson, Knoxville, TN (5 pages).

(Continued)

*Primary Examiner* — Manuel A Rivera Vargas
(74) *Attorney, Agent, or Firm* — Luedeka Neely Group, P.C.

(57) ABSTRACT

An apparatus continually monitors predictive maintenance information and analyzes incoming measurements resulting in recommendations for improving setup information, such as machine information and measurement configurations. Smart sensors generate sensor signals corresponding to the parameters of a machine and a transducer converts the sensor signals into digital sensor data, which is stored into memory. An analyzer determines current operating characteristics of each machine and runs an improvement cycle in which it calculates new setup information. For example, the analyzer may calculate a new alert limit, which is a new measurement configuration that may be saved in the database as a new stored measurement configuration replacing an old measurement configuration. The analyzer may also calculate new machine information. For example, the analyzer may identify features in a frequency spectrum that are characteristic of a particular geartrain that is different from the geartrain identity provided in the predictive maintenance database. The analyzer may automatically change the identity of the geartrain in the predictive maintenance database, or it may suggest the change to the operator. The analyzer also runs an analysis cycle during which current operating conditions of each machine are determined and signals are issued based on the current operating conditions.

19 Claims, 6 Drawing Sheets

(56) References Cited

OTHER PUBLICATIONS

Emerson, Reliability Solutions, Product Data Sheet, Oct. 2018, AMS 2140 Machinery Health Analyzer, Copyright 2018, Knoxville, TN. (12 pages).
Fluke Corporation, Technical Data Flue 3560 FC Vibration Sensor and Fluke 3502 FC Gateway, Everett WA, Copyright 2017. (3 pages).
General Electric, GE Measurement Control, ADRE* System, Bentley Nevada Asset Condition Monitoring Brochure, Copyright 2005-2015 General Electric Company (12 pages).
General Electric, S1, System 1* Machinery Condition Monitoring, Document 102M7750 Rev. D, GE Imagination at Work (4 pages). Copyright 2014-2017 Bently Nevada, Inc.
SKF Group, SKF Multilog On-line System IMx-M State of the art solution for protecting and enhancing the reliability of your critical machinery, SKF Sverige AB, Sweden, Copyright 2018 (20 pages).

* cited by examiner

FIG. 4

① GEARBOX INFORMATION — 150
IDENTIFICATION
GBX123
DESCRIPTION BOILER FEED PUMP GEARBOX
CATEGORY
ORIENTATION ⦿ HORIZONTAL   VERTICAL

② GEARBOX MODEL MANUFACTURER — 152
MANUFACTURER
MODEL [LIBRARY]
MODEL

③ GEARBOX ASSET INFORMATION — 154
ASSET ID
SERIAL NUMBER

④ GEAR BOX GEAR RATIO — 156
SHAFTS 5
SPEED 1792  INPUT SHAFT   # TEETH 10
TEETH 10   SHAFT2        # TEETH 20
TEETH 20   SHAFT3        # TEETH 10
TEETH 10   SHAFT4        # TEETH 10
TEETH 20   SHAFT5 OUTPUT SPEED 224
RATIO 8 TO 1

| ENERGY IN RANGE TYPE | DESCRIPTION | LOW | HIGH | ORDERS |
|---|---|---|---|---|
| ☑ TOTAL ENERGY | TOTAL ENERGY | 0 | MAX | |
| ☑ ENERGY IN RANGE | 1 X BPFO ENERGY | 17.2 | 17.3 | |
| ☑ ENERGY IN RANGE | 1 X ENERGY | 0.9 | 1.1 | |
| ☑ ENERGY IN RANGE | 2 X ENERGY | 1.9 | 2.1 | |
| ☑ SYNCHRONOUS ENERGY IN RANGE | SYNCHRONOUS ENERGY | 0.9 | 17 | |
| ☑ NON-SYNCHRONOUS ENERGY IN RANGE | NON-SYNCHRONOUS ENERGY | 0.9 | 17 | |
| ADD | | | | |

| RELATIVE SYNCHRONOUS TYPE | DESCRIPTION | ORDER | # HARMONICS |
|---|---|---|---|
| ☑ RELATIVE SYNCHRONOUS | 1 X RELATIVE SYNCHRONOUS | 1 | 4 |
| ADD | | | |

| PEAK & PHASE TYPE | DESCRIPTION | ORDER |
|---|---|---|
| ☑ SYNCHRONOUS PEAK | 1 X SYNCHRONOUS PEAK | 1 |
| ☑ SYNCHRONOUS PHASE | 1 X SYNCHRONOUS PHASE | 1 |
| ☑ SYNCHRONOUS PEAK | 2 X SYNCHRONOUS PEAK | 2 |
| ☑ SYNCHRONOUS PHASE | 2 X SYNCHRONOUS PHASE | 2 |
| ADD | | |

| WAVEFORM TYPE | DESCRIPTION | AVERAGING |
|---|---|---|
| ☑ PEAK VALUE | WAVEFORM PEAK | NORMAL |
| ☑ PEAK-TO-PEAK | WAVEFORM PEAK TO PEAK | NORMAL |
| ☑ VARIANCE | WAVEFORM VARIANCE | NORMAL |
| ☑ SKEWNESS | WAVEFORM SKEWNESS | NORMAL |
| ☑ KURTOSIS | WAVEFORM KURTOSIS | NORMAL |
| ☑ CREST FACTOR | WAVEFORM CREST FACTOR | NORMAL |
| ADD | | |

| OTHER TYPE | DESCRIPTION |
|---|---|
| ☑ TEMPERATURE | TEMPERATURE |
| ADD | |

FIG. 5

METHOD AND APPARATUS FOR MACHINE MONITORING WITH CONTINUOUS IMPROVEMENT OF A PREDICTIVE MAINTENANCE DATABASE

FIELD

This invention relates to the field of predictive maintenance of machines. More particularly, this invention relates to an apparatus and method for monitoring machines for predictive maintenance purposes with continuous improvement in a predictive maintenance database.

BACKGROUND

Configuring and maintaining a predictive maintenance database is a complex operation requiring accurate machine information and measurement configurations. Measurement configurations define how the data should be collected and the alert limits against which the results will be compared. When beginning predictive maintenance for machines, it is often difficult to provide all the information required for optimal predictive maintenance analytical results. Some machine information may not be readily available such as the specific bearings installed in the machine. Further, measurement alerts limits are not necessarily consistent across like machines and are often environmentally specific. Initially, there will be insufficient measurement data available to establish reliable alert limits based on statistical analysis. To continuously improve these and other important machine information, it was incumbent on the maintenance staff to periodically review the information and make the necessary updates. Due to lack of time and expertise, this generally is not satisfactorily accomplished, resulting in sub-optimal analytical results.

SUMMARY

To overcome these limitations, this invention establishes a method and apparatus for continually monitoring the predictive maintenance information and analyzing incoming measurements resulting in recommendations for improving machine information and measurement configurations for the ultimate purpose of providing optimal predictive maintenance analytical results.

In accordance with one embodiment, an apparatus is provided for collecting predictive maintenance data from rotating machines in a set of machines and continuously improving a predictive maintenance database. The database includes stored setup information, such as stored machine information and stored measurement configurations, for each machine. The sensing apparatus is provided with at least one sensor for sensing parameters of the machine and for generating sensor signals corresponding to the parameters of the machine. A transducer converts the sensor signals into digital sensor data, which is stored into memory. An analyzer communicates with the sensing apparatus and receives the digital sensor data, and it analyzes the data to determine measured machine values that are values representing a feature or measurement of a machine occurring during operation of the machine. For example, a measured machine value of a machine would include values representing features or measurements of a machine such as total energy of vibration, vibration amplitudes at various frequencies, temperatures, voltages, currents, magnetic field strength and the like.

The analyzer runs an improvement cycle in which it calculates new setup information. For example, new measurement configurations may be calculated for each of the machines being monitored, and such configurations are based upon the digital sensor data, the measured machine values or both. The analyzer selectively stores the new measurement configurations in the predictive maintenance database based on either user input or configuration replacement rules or both. For example, the analyzer may calculate a new alert limit, which is a new measurement configuration that may be saved in the database as a new stored measurement configuration replacing an old measurement configuration. An example of a configuration replacement rule would be to compare a stored alert limit to a new calculated alert limit, and automatically replace any stored alert limit if the stored alert limit is greater than the new calculated alert limit. This is a simplistic rule to illustrate the concept of an automatic replacement rule.

The analyzer may also calculate new machine information for each machine based on the digital sensor data or the current operating characteristics or both, and the new machine information is stored in the predictive maintenance database based on user input or machine information replacement rules or both. For example, the analyzer may calculate a frequency spectrum and determine that a feature of the spectrum is characteristic of a particular geartrain that is different from the geartrain identity provided in the predictive maintenance database. One possible cause of this unexpected frequency spectrum could be that the identity of the geartrain was incorrectly entered into the initial predictive maintenance database. The analyzer may automatically change the identity of the geartrain in the predictive maintenance database, or it may suggest to the operator that such change be made. In the latter case, the operator will make the final decision as to whether the geartrain identity should be changed. A simplistic example of an automatic replacement rule is to replace the identity of a geartrain any time the calculated geartrain identity is different from the stored geartrain identity.

The setup information may be machine information including a unique identifier for each machine being monitored, a generic description of the machine, a specific description of the machine, make of machine, model of machine, nominal characteristics of a machine, nominal operating speed, nominal horsepower, identity of bearings, a description of bearings, the number of rollers or balls in bearings, the identity of gear trains, a description of gear trains, and the number of teeth on each gear in a gear train. The setup information may also include measurement configuration of a machine such as collection information, filters that will be imposed on the measurements, band pass filters, window functions, properties to be measured, vibration, temperature, speed, electrical and magnetic fields, specified frequency spectrums of time domain signals, and an amplitude and a frequency of the maximum amplitude within a specified frequency band.

The analyzer may be programmed to determine a frequency spectrum for the machine based on the digital sensor data and stored measurement configurations. Using the frequency spectrum, the analyzer calculates the rotational speeds of the machine to produce a calculated rotational speed for the machine. The digital sensor data is then analyzed to determine measured machine values of the machine based on the digital sensor data and the calculated rotational speeds of each machine. The improvement cycle then operates using the spectrum and the data calculated using the spectrum to produce new setup information.

The analyzer may also run an analysis cycle during which the measured machine values are evaluated against the stored measurement configurations, and one or more current operating conditions of each machine is determined by this evaluating step. The analyzer issues signals as to the operating condition of the machines based upon the current operating conditions as determined above. For example, the analyzer may determine the maximum amplitude of vibration within a specified frequency band, and it will compare it to a stored alert level in the predictive maintenance database for that particular frequency band. If the determined maximum amplitude exceeds the alert level, the analyzer will issue an alert signal indicating that the operating condition of the machine is one of "alert".

The invention includes the methods performed by the analyzer such as a method for collecting machine data in which machine parameters of a machine are sensed and sensor signals are generated corresponding to the machine parameters. The sensor signals are converted into digital sensor data and stored in a memory, and stored setup information is added into a predictive maintenance database in a machine analyzer. The digital sensor date is then analyzed to determine measured machine values of the machine, and an improvement cycle is begun, in which new setup information is calculated based on one or more of the digital sensor data and the measured machine values. The new setup information is selectively stored in the predictive maintenance database based on one or more of user input and setup information replacement rules.

An embodiment of the method may include running an analysis cycle for the machine includes evaluating one or more of the measured machine values against the stored setup information and determining one or more current operating conditions of the machine based on the evaluating step, and then issuing one or more signals based upon and indicating one or more current operating conditions of the machine. In a more particular embodiment, the method may include determining a frequency spectrum for the machine based on the digital sensor data and stored measurement configurations, and calculating rotational speeds of the machine. The digital sensor data is then analyzed to determine measured machine values of the machine based on the digital sensor data and the calculated rotational speeds. For example, the analysis may include calculating new setup information based on the digital sensor data, the frequency spectrum and the calculated rotational speed, and determining whether the stored setup information should be edited based on one or more of editing rules and user input. If the stored setup information should be edited, it is edited based on the new setup information. Also, the method may include calculating new machine information based on one or more of the digital sensor data, the frequency spectrums and the calculated rotational speeds to produce new machine information for the machine, and then determining whether the stored machine information should be edited based on one or more of editing rules and user input, and if so, editing the stored machine information based on the new machine information.

BRIEF DESCRIPTION OF THE DRAWINGS

Further advantages of the invention are apparent by reference to the detailed description when considered in conjunction with the figures, which are not to scale to more clearly show the details, wherein like reference numbers indicate like elements throughout the several views, and wherein:

FIGS. 4 and 5 illustrate one menu used to input machine information and measurement configurations into a predictive maintenance database.

DETAILED DESCRIPTION

Figure 1:
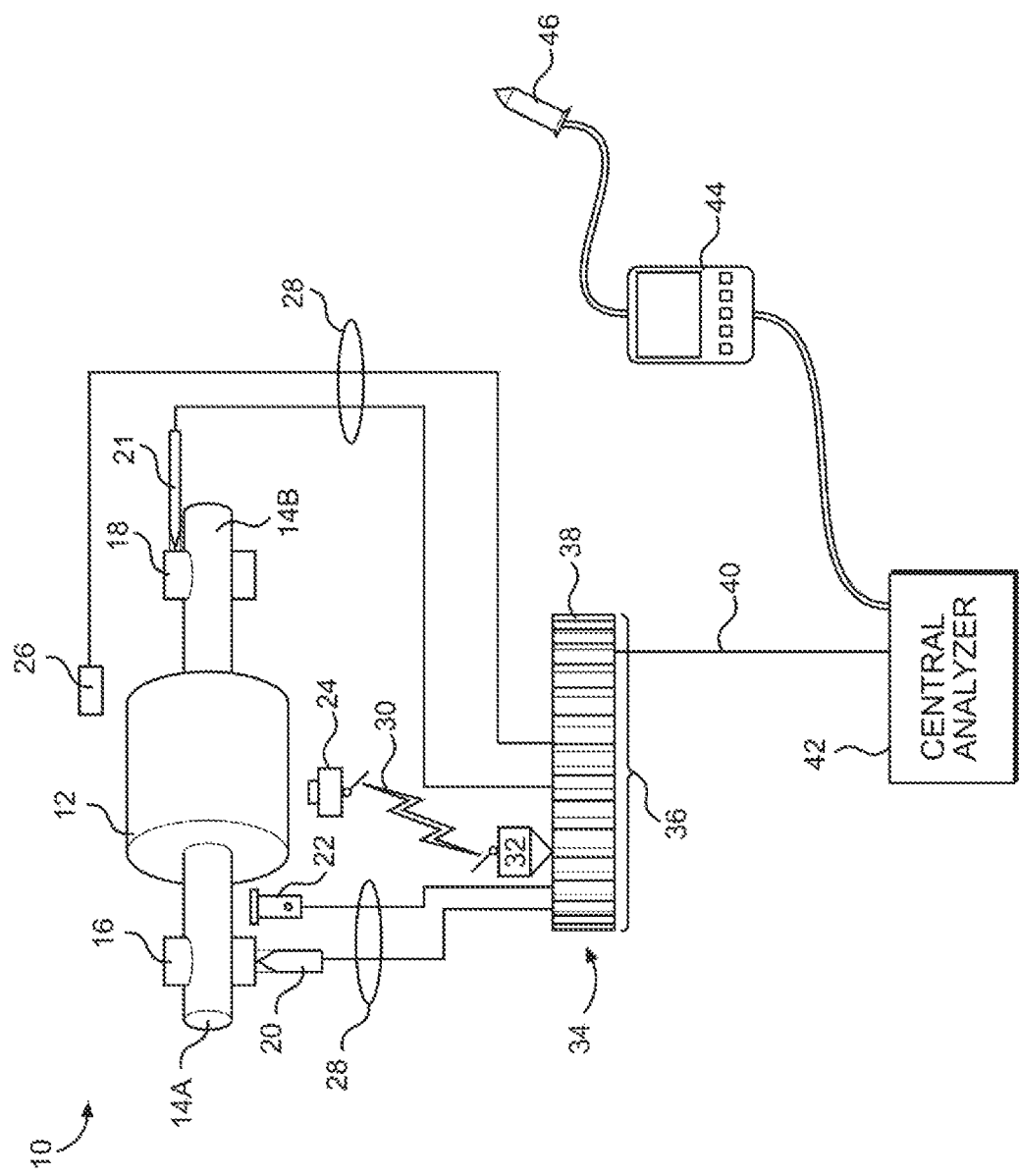
FIG. 1 is a schematic diagram of a predictive maintenance analyzer system monitoring a machine to produce predictive maintenance data.

Referring now to FIG. 1, there is shown a schematic diagram 10 illustrating a machine 12 being monitored by a Machine Works analyzer 42 constituting one embodiment of the invention. This embodiment is provided as an example and is not a limitation upon the scope of the invention. The machine 12 represents an electric motor, a pump or any number of machines that might be found in a manufacturing or industrial environment. The machine 12 includes a forward rotating shaft 14*a* mounted on bearings 16 and a rearward rotating shaft 14*b* mounted on bearings 18. A sensor 20 is mounted on the bearing 16 oriented to measure vertical vibration, which is perpendicular to the axis of the shaft 14*a*. A tachometer 22 is positioned to measure the rotating speed of the shaft 14*a*, and a temperature sensor 24 is monitoring the temperature of the machine 12 preferably by a noncontact method. A flux sensor 26 is located proximately to the machine 12 to monitor electromagnetic fields, such as magnetic fields, in the vicinity of the machine 12. A vibration sensor 21 is mounted horizontally on the bearing 18 to measure vibration in a horizontal direction parallel to the axis of the rotating shaft 14*b*.

The sensors described above could be analog sensors, but preferably all of the sensors are smart sensors including analog sensors, analog signal preprocessing, amplification, filtering and analog-to-digital conversion. Thus, each of the smart sensors transmits a digital sensor signal while pure analog sensors transmit analog signals.

The signals from sensors 20, 21, 22, and 26 are transmitted to a data collector 34 by communication lines 28. The collector may be an AMS 2140 vibration data analyzer manufactured by Emerson Electric Co. The sensor 24 includes a wireless transceiver communicating with a wireless transceiver 32 that is electrically connected to the data collector 34. Thus sensor 24 sends a wireless transmission signal 30 to the collector 34. The collector 34 includes a plurality of collector cards 36 each of which is capable of communicating with one or more sensors and includes data processing capabilities. The collector cards 36 store raw data received from the sensors and also conduct limited analysis of the signals. For example, the cards 36 may create a frequency spectrum of the data received or may evaluate a particular frequency of the signal received to determine whether that signal at that particular frequency is in an alert condition.

The collector 34 also includes a communication card 38 that communicates with all of the collector cards 36 and also communicates with a central analyzer 42, which may be a Machine Works Analyzer manufactured by Emerson Electric Co. The central analyzer 42 represents a data processor capable of analyzing data and issuing control commands to machines. It also represents typical communication abilities, including user input and output, such as a keyboard and a display screen. The central analyzer 42 may also communicate with a portable analyzer 44 (such as an EMS 2140 manufactured by Emerson) that collects data from one or more machines and downloads it to the central analyzer 42 either by a wired connection or wirelessly. The portable analyzer 44 is capable of operating with numerous sensors 46, such as a vibration sensor, a temperature sensor, or a magnetic flux sensor, and typically the portable analyzer 44 is used to collect data from a number of machines and download the data to the central analyzer 42.

The central analyzer 42 is programmed with a predictive maintenance database that includes setup information. Two forms of setup information are machine information and measurement configuration. Machine information may include a unique identifier for each machine being monitored, a generic description of the machine, a specific description of the machine including make and model number, and nominal characteristics of the machine such as nominal operating speed, horsepower and the like. Machine information may also include the identity of bearings, a description of bearings, the number of rollers or balls in bearings, the identity of gear trains, a description of gear trains, and the number of teeth on each gear in a gear train. Thus, machine information relates to any physical attribute or operating characteristic of a particular machine.

As used herein, measurement configuration is used in a broad sense and would include anything related to what measurements are taken and how they are evaluated. For example, measurement configurations would include alert limits and waveform acquisition setting. They include collection information such as what filters that will be imposed on the measurements, like band pass filters and window functions. Measurement configurations also include what property will be measured, like vibration, temperature, speed, electrical and magnetic fields, specified frequency spectrums of time domain signals, specific frequency bands, a maximum amplitude within a specific frequency band, and alert conditions. These measurement configurations may be used by the central analyzer 42, or they may be communicated to the data collector 34 or the portable analyzer 44 for use in processing data before it arrives at the central analyzer 42.

Figure 2:
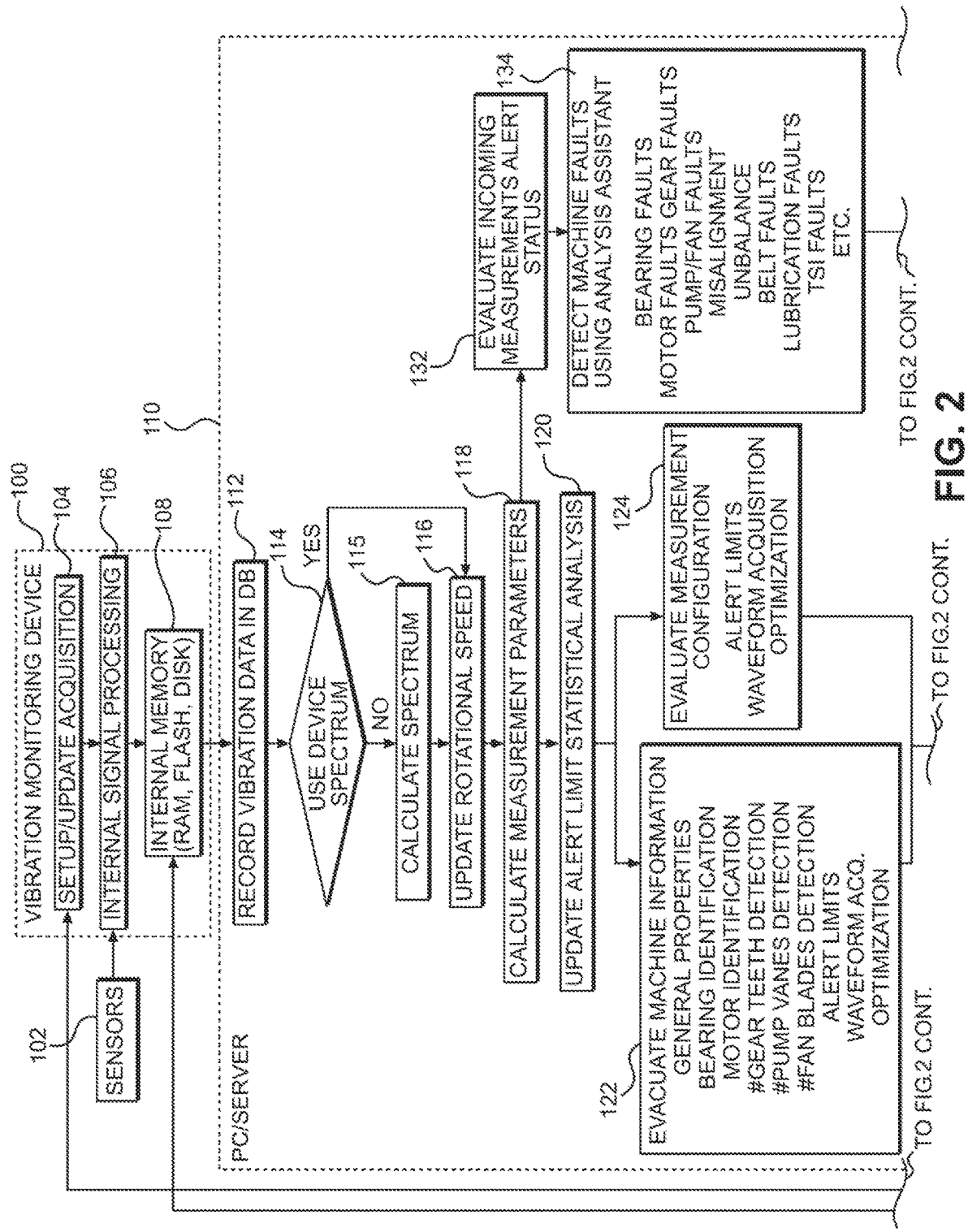
FIG. 2 is a flow chart illustrating the operation and programming of a central analyzer producing predictive maintenance data continuously improving machine information and measurement configurations that are stored in a predictive maintenance database.
Figure 2:
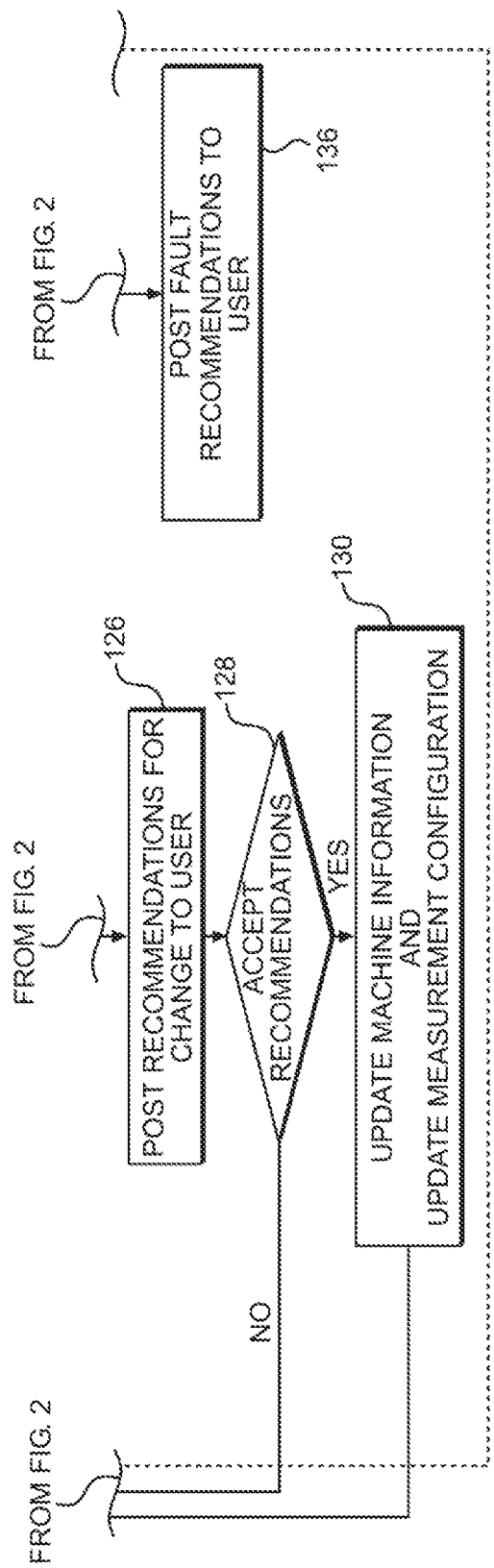
Figure 3:
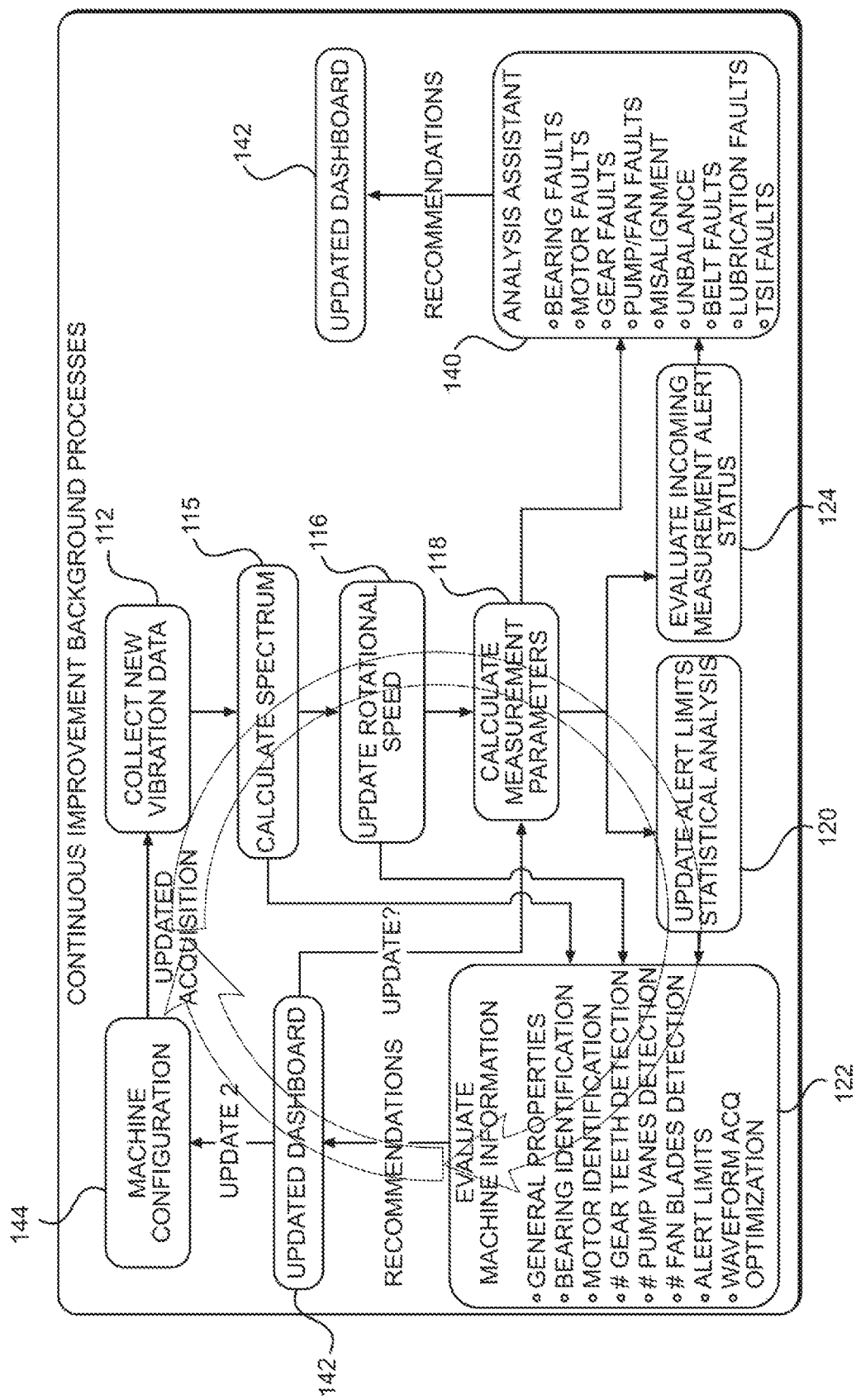
FIG. 3 is another flow chart illustrating the operation and programming of the central analyzer.

The setup information, such as machine information and measurement configurations, is illustrated in FIG. 2 in the box titled "evaluate machine configuration." typically entered by the user during set up using input menus, such as the menu illustrated in FIG. 3. Alternatively, the machine information and measurement configurations may be imported from other applications.

From the above discussion, it will be understood that analysis of the sensor signals is done collectively by the sensors 20, 21, 22, 24 and 26, the collector 34, the central analyzer 42 and the portable analyzer 44, and all of these components collectively constitute "an analyzer". As the term is use herein, "an analyzer" would apply to any component that is conducting analysis of data even if that component is also conducting other functions.

One function of the central analyzer 42 is the creation and maintenance of a predictive maintenance database that stores data indicating the performance and operating characteristics of the machines. This data is continuously analyzed to predict future faults so that maintenance can be performed hopefully before a catastrophic fault occurs. Thus, the central analyzer 42 will issue alert signals to indicate that certain operating conditions are unusual and may need attention, and it may also issue alert signals indicating that an operating condition is unusual and needs urgent attention.

In addition to performing its usual functions, the central analyzer 42 continuously improves both the machine information and the measurement configurations as data is collected. This continuous improvement begins when data is either stored periodically from the portable analyzer as analyzer 44 or is continuously provided from wired and wireless devices as sensors 20, 21, 22, 24 and 26. How the data should be acquired is dependent on the characteristics of the machines being monitored and specified by the machine information. This machine information is provided to the portable analyzer 44, the data collector 34 and to the sensors by the central analyzer 42, and the user initially creates the machine information. Likewise, the user initially provides the machine information to the central analyzer.

Referring to FIG. 2, a flowchart is shown illustrating the program performed by the central analyzer 42 in combination with its upstream components such as the data collector 34, the portable analyzer 44 and the sensors 20, 21, 22, 24 and 26. As indicated by box 100, the program begins by acquiring data through a vibration monitoring device such as the vibration sensors previously described. In FIG. 2, the sensors box 102 collectively represents the sensors described and shown in FIG. 1, plus the data collector 34 and the portable analyzer 44. As indicated at box 104, the user creates an initial setup of the sensors and that initial setup may be updated during acquisition of data. For example, each sensor may be set up to monitor a specific frequency range, and sensors may be also set up to impose window functions on vibration signals detected. As indicated at box 106, the sensors 102 perform internal signal processing which may include analog signal processing and filtering, as well as digital signal processing. The sensors may generate a frequency spectrum depending upon the user set up. The data is then stored in memory and the sensors 102, as indicated by box 108.

At periodic times, or continuously, the central analyzer 42 communicates with the sensors 102 and records vibration data into the predictive maintenance database. When periodic signals are being collected, such as vibration data, the first step in analyzing the data is to acquire a vibration spectrum. The vibration spectrum may be calculated directly from sensor signal data (the signal waveform) by the central analyzer 42, or the central analyzer may accept a vibration spectrum that has been calculated upstream from the analyzer 42. For example, the data collector 34 or the portable analyzer 44 may have calculated a vibration spectrum which is transmitted to the central analyzer 42 along with the raw digital data provided by the sensors, such as sensor 20. As indicated at box 114, the central analyzer 42 first determines whether to use a device spectrum, which is a spectrum previously produced by one of the upstream devices such as the data collector 34 or the portable analyzer 44. This decision may be made by a rule that is consistently applied each time for a particular sensor, or a user can manually make the decision each time the data from that particular sensor is updated or supplemented. If the decision is "no", the central analyzer 42 will calculate a spectrum within the frequency range specified by the measurement configurations based on the raw data provided by the sensors 102. The analyzer 42 will use the spectrum to update the rotational speed as indicated at box 116. If the device spectrum is used, the step at box 115 is skipped and the device spectrum is used to calculate rotational speed.

To calculate rotational speed, different techniques may be used to analyze the spectrum and determine the rotational speed of the machine. In one embodiment, the analyzer 42 locates peaks in the spectrum and then scans the spectrum at rotational speed increments to provide candidate rotational speeds. For each candidate rotational speed, a number of associated harmonics is identified, and the closest peaks to the candidate rotational speeds and its associated harmonics are located. The gaps between the closest peaks and the candidate rotational speeds and its associated harmonics are measured. Then, the gaps associated with each candidate rotational speed are added together to create a total gap number, and the candidate rotational speed having the smallest total gap number is selected as the correct rotational speed. This technique operates on the principle that a particular speed is the correct speed when vibration peaks are found at or near that particular speed and at harmonics of that particular speed.

Next, as indicated in box 118, the central analyzer 42 calculates measured machine values that are to be stored in the predictive maintenance database. For example, the measurement configuration may provide that the amplitude of vibration at various harmonics of the rotational speed should be determined and recorded in the database. Using the rotational speed determined from the spectrum, the amplitudes at the specified harmonics may be determined and stored as measured machine values. These values are "calculated" because the spectrum was calculated and then values from the calculated spectrum were stored as data.

As indicated at box 120, the data will then be analyzed to determine alert limits by statistical analysis. The original alert limits were set by the user or updated by previous statistical analysis. With the new sensor data and measured machine values, additional statistical analysis may be performed and the alert limits may be updated. There are numerous known statistical techniques for calculating alert limits based on vibration data, or other data, created by the same or similar machines in the same or similar environments with the same or similar loads or operating conditions. Any of these known techniques may be used by an analyzer to calculate or re-calculate alert limits.

Next, as indicated at box 122, analyzer 42 evaluates the accuracy of the machine information. For example, the type of information reviewed may include the general properties of the machine, bearing identification, motor identification, the number of gear teeth, the number of pump vanes or the number of fan blades. Most of this information may be determined by evaluating the peaks in the frequency spectrum. For example, a motor having a nominal speed of 1200 RPM will have characteristic peaks in the frequency spectrum at or near 20 Hz and harmonics of 20 Hz. If these frequencies are missing, it indicates that the nominal speed of 1200 RPM is probably a mistake. If the spectrum contains peaks at 30 Hz and harmonics of 30 Hz, the nominal speed of the motor it is likely 1800 RPM. Using this information, the analyzer 42 may suggest that the nominal speed of the motor is 1800 RPM, and using a lookup table for common motors operating at 1800 RPM, it may suggest a particular motor or a particular motor type.

In a similar fashion, bearings may be identified as to the number of rollers. Once the speed of the machine is known, the roller bearing will produce a characteristic vibration that is a function of the speed of the machine and the number of rollers in the bearing. So, for example a particular bearing operating at a particular rotational speed would be expected to produce a particular characteristic frequency peak. If that characteristic frequency peak is not present, the absence of the frequency peak would suggest that the number of rollers in the bearing and the identity of the bearing has been improperly identified, and that fact may be communicated to the user. Likewise, the frequency spectrum may be analyzed to identify other frequency peaks that may represent a characteristic frequency peak of the bearing. Based on these candidate peaks, the analyzer may suggest the number of rollers in the bearing, and using a lookup table, it may suggest the particular identity of the bearing or the particular bearing type.

In a similar fashion, gear teeth will produce a characteristic frequency depending on the number of teeth on the gear and the speed at which they are operating. Pump vanes will cause a characteristic frequency depending upon the number of vanes and the speed at which the pump is operating, and fan blades will create a characteristic frequency depending on the number of blades and the speed at which the fan is operating. Looking for the presence or absence of these characteristic frequencies, the central analyzer 42 may determine whether the gears, pumps and fans have been properly identified with the proper number of teeth, vanes or blades. If the item has been identified incorrectly, such information may be transmitted to the user, and as before, the spectrum may be analyzed to determine the probable number of gear teeth, pump vanes or fan blades. Using lookup tables, the analyzer 42 may suggest possible identities of the gear train, the pump or the fan, or their types.

As indicated at box 126 these recommendations may be posted to the user, and the user may either accept or reject the recommendations as indicated at box 128. In addition to accepting or rejecting the recommendations manually, the user may set rules to determine whether the recommendations are accepted. For example, if the central analyzer 42 determines that the number of rollers in a bearing is incorrect and it is suggesting that the number be changed, a rule can specify that the number of bearing rollers may be changed automatically. However, a separate rule may provide that a suggestion as to a change in the speed of the machine may not be automatically updated, without manually-entered user approval. Once the rules and user input are received, the machine information may be updated into memory as indicated at box 130.

The measurement configuration for each machine also may be continuously updated as indicated at box 124. For example, the central analyzer may determine that the alert limits for a particular machine are too high or too low based on the statistical analysis of other similar machines in similar environments. For example, the danger alert limit could be increased from 2.1 G to 2.9 G.

Likewise, the central analyzer 42 may update waveform acquisition settings to achieve optimization. For example, the analyzer 42 may increase the frequency range of the waveform to be collected.

As before, the analyzer 42 will post recommendations for changes in the measurement configuration to the user as indicated at box 126, and the recommendations may be accepted or rejected as indicated at box 128 by the user or by rules. If the measurement configuration changes are accepted, as indicated box 130, the measurement configuration is updated and stored into memory for that particular machine.

Returning to box 118, the analyzer performs two operations in parallel after it calculates the measured machine values. In addition to evaluating machine information and measurement configurations, it performs the normal tasks of analyzing the data (measured machine values) for alerts as indicated at box 132. As indicated box 134, the analyzer also detects machine faults using various analysis rules or by using a software analysis assistant. The types of faults that may be detected depend upon the initial measurement configuration and include faults in bearings, motors, gears, pumps, fans, belts, lubrication, TSI and similar equipment components. Likewise, the analyzer 42 detects misalignment and unbalance. When faults are detected, they are posted to the user as indicated at box 136 and the user may act upon the faults as desired. Alternatively, rules may be utilized at box 136 to automatically issue commands depending on the type and severity of the fault. For example, in the case of a severe fault indicating imminent failure of the machine, a shutdown command could be issue. In the case of a severe but lesser fault, an automatic alert could be issued. The processes represented by boxes 132-136 represent an analysis cycle, and the processes represented by boxes 120-130 represent an improvement cycle. These two cycles occur in parallel, meaning that they are independent and neither will interfere with the other. In this embodiment both cycles run each time data is received from sensors on a machine, and thus they occur concurrently at the approximately the same time with neither cycle waiting on the other. In other embodiments either cycle could be delayed. For example, the improvement cycle may be delayed to allow the analysis cycle to complete as fast as possible and then the improvement cycle may be run immediately after the analysis cycle. In other embodiments, the improvement cycles for a group of machines could be further delayed to allow analysis cycles for the group of machines to run before the improvement cycles are allowed to run.

Referring now to FIG. 3, a simplified and slightly different flow diagram is shown illustrating how data may be collected and processed to continuously improve machine information and measurement configurations. Boxes illustrating the same or similar functions in FIG. 3 as in FIG. 2 are provided with the same reference character. In FIG. 3, the continuous improvement background process begins at box 112 indicating generically the collection of new vibration data as the first step of the process. Based on the new data one or more spectrums are calculated as indicated at box 115, and then the rotational speed of the machine is updated based on either the spectrums or speed sensor information. At box 118 measurement parameters are calculated as previously specified by the original set up or updates of the original set up. Based on the parameters, at box 120 alert limits are updated, such as by statistical analysis as previously described.

Also, in parallel the presence or absence of alerts are determined as indicated at box 124 based on the measurement parameters and the alert limits currently existing. The measurement parameters from box 118 and the alert status information from box 124 is transmitted to an analysis assistant at box 140, where the central analyzer 42 evaluates the incoming data to determine the type of faults that may exist and the severity of the faults. Based on this analysis, recommendations as to changes in measurement configurations are transmitted to the dashboard 142, which is visually perceived by the user. The dashboard typically gives the user options that must be approved by the user before any action is taken. In some instances, however, certain recommendations are automatically accepted and acted upon, and information is displayed on the updated dashboard 142 that identifies the type and severity of the fault and the action that was taken.

As indicated at box 122, the calculated spectrums, the rotational speeds, the calculated measurement parameters, and the updated alert limits are evaluated by the analyzer 42 to determine whether the setup information is accurate and, if not, accurate information is calculated and recommendations are made to the user as to new or updated machine information. As indicated at box 142 the recommendations as to updated setup information may be displayed to the user who may approve or reject the recommendations. Alternatively, updates to the machine information may be automatically accepted based on rules set by the user.

As previously discussed, the rules set by the user as to whether recommendations are automatically accepted may be simple or complex. For example, the user could specify that all recommendations are automatically accepted. Alternatively, the user can specify that no recommendations are automatically accepted. A more complicated rule could provide that a recommendation is automatically accepted if its magnitude is within X percent of the magnitude of the original setting. Yet another setup rule could be that any recommendation based on statistical analysis of multiple machines is automatically accepted. These simple examples are intended to illustrate that many different types of rules may be used to determine whether a recommendation is automatically accepted. The default rule would be that no recommendation is accepted without user approval.

After the recommendations have been provided as indicated at box 122 and 140 and have been accepted or rejected by the user or by rules, the updated setup information is stored in memory as indicated by box 144, and the process begins again as indicated at box 112. As indicated by the circular arrow 146, the processes on the left side of the flow chart (beneath the arrow 146) represent the continuous process of updating setup information such as machine information and measurement configuration. The processes on the right of FIG. 3 (not beneath the arrow 146) represent the many different types of fault analysis that may be performed by an analyzer independently of the continuous improvement of the setup information.

As discussed above, the original set up information includes machine information and measurement configurations provided by the user through a menu. Referring to FIG. 4, one example of a menu used to provide machine information is shown. As indicated at block 150, this particular menu is receiving gearbox information and at block 150 the user may provide an identification number or name, the description of the gearbox, the category of the gearbox and whether it is horizontal or vertical. At block 152, the user may provide the name of the manufacturer and the model number of the gearbox. At box 154 the user may provide an asset ID and a serial number, which are typically internal identification numbers relevant only to a particular user. At box 156 the user may input the number of shafts, the input speed to the first shaft and then the number of teeth on the output and the input of each shaft. Finally, the output speed is calculated and displayed, and the ultimate input to output ratio is also calculated and displayed based on the number of teeth on the outputs and inputs of each shaft. This menu is intended to be exemplary, and it is understood that numerous different types of menus are provided to the user for entering information as to numerous different types of machines.

FIG. 5 illustrates a menu for inputting measurement configurations that control how data is processed. This particular menu is just example and it relates to the gearbox identified in FIG. 4. Using drop-down menus and checkboxes, the user may select the type of information that is to be collected and calculated. In this example, five types of information may be specified, namely, the energy in a frequency range, the relative synchronous type, peak and phase information, waveform type and "other" types such as temperature. Once this measurement configuration information is provided by the user, the analyzer will collect and analyze data based on the user's selections.

From the description above, it will be understood that the apparatus of the present invention continuously checks and improves its own internal setup information, typically, machine information and measurement configurations, as it collects data and performs the other traditional functions of a machine analyzer in a predictive maintenance system.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for collecting predictive maintenance data from machines comprising:
    a sensing apparatus having at least one sensor for sensing machine parameters and for generating sensor signals corresponding to the machine parameters, a transducer for converting the sensor signals into digital sensor data, and a memory for storing the digital sensor data; and
    an analyzer programmed for:
        inputting stored setup information into a predictive maintenance database,
        communicating with the sensing apparatus and receiving the digital sensor data,
        analyzing the digital sensor data to determine measured machine values,
        calculating new setup information based on one or more of the digital sensor data and the measured machine values to produce new setup information, and
        selectively storing the new setup information in the predictive maintenance database based on one or more of user input and setup information replacement rules.

2. The apparatus of claim 1 wherein the analyzer is programmed for running an analysis cycle for the machine, comprising:
    evaluating one or more of the measured machine values against the stored setup information and determining one or more current operating conditions of the machine based thereon, and
    issuing one or more signals based on and indicating one or more current operating conditions of the machine.

3. The apparatus of claim 1 wherein the stored setup information comprises machine information including one or more of a physical attribute of the machine and an operating characteristic of the machine.

4. The apparatus of claim 1 wherein the stored setup information comprises machine information including one of more of: a unique identifier for each machine being monitored, a generic description of the machine, a specific description of the machine, make of machine, model of machine, nominal characteristics of a machine, nominal operating speed, nominal horsepower, identity of bearings, a description of bearings, the number of rollers or balls in bearings, the identity of gear trains, a description of gear trains, and the number of teeth on each gear in a gear train.

5. The apparatus of claim 1 wherein the stored setup information comprises a measurement configuration of a machine including one of more of the measurement parameters for a machine and the manner by which the measured machine values are evaluated by the analyzer.

6. The apparatus of claim 1 wherein the stored setup information comprises a measurement configuration of a machine including one of more of: collection information, filters that will be imposed on the measurements, band pass filters, window functions, properties to be measured, vibration, temperature, speed, electrical and magnetic fields, specified frequency spectrums of time domain signals, and an amplitude and a frequency of the maximum amplitude within a specified frequency band.

7. The apparatus of claim 1 wherein the analyzer is further programmed for:
    determining a frequency spectrum for the machine based on the digital sensor data and stored measurement configurations;
    calculating the rotational speeds of the machine based on the digital sensor data to produce a calculated rotational speed for the machine;
    analyzing the digital sensor data to determine measured machine values of the machine based on the digital sensor data and the calculated rotational speeds of each machine;
    calculating the new setup information based on one or more of the digital sensor data, the frequency spectrum and the calculated rotational speed; and
    determining whether the stored setup information should be edited based on one or more of editing rules and user input, and if the stored setup information should be edited, editing the stored setup information based on the new setup information.

8. The apparatus of claim 1 wherein the stored setup information comprises one or more of machine information and measurement configurations.

9. The apparatus of claim 1 wherein the stored setup information comprises one or more of alert limits, frequency spectrums to be produced by the analyzer, and a speed parameter to be calculated by the analyzer based on the frequency spectrum.

10. The apparatus of claim 2 wherein running an analysis cycle further comprises:
    evaluating the measured machine values against stored machine fault conditions and determining whether the machine is operating in a fault condition, and
    issuing the machine fault signal if the machine is operating in a fault condition.

11. The apparatus of claim 1 wherein the analyzer comprises one or more of a central analyzer, a portable analyzer, a data collector, and a smart sensor.

12. An apparatus for collecting predictive maintenance data from a defined set of machines, and for storing the predictive maintenance data in athe predictive maintenance database that includes stored machine information, stored measurement configurations that include alert limits, and measured machine values for each machine, the apparatus comprising:
    a sensing apparatus having:
        at least one sensor for sensing machine parameters of the machines and for generating sensor signals corresponding to the machine parameters, a transducer for converting the sensor signals into digital sensor data, and a memory for storing the digital sensor data; and an analyzer programmed for:

inputting stored machine information and stored measurement configurations into the predictive maintenance database, communicating with the sensing apparatus and receiving the digital sensor data, determining a frequency spectrum for each machine based on the digital sensor data and stored measurement configurations for each machine, calculating the rotational speeds of the machines based on the digital sensor data to produce a calculated rotational speed for each machine, calculating new measured machine values for each of the machines being monitored based on one or more of the digital sensor data, the frequency spectrums and the calculated rotational speeds, and storing the new measured machine values in the predictive maintenance database, for each machine, calculating new machine information based on one or more of the digital sensor data, the frequency spectrums and the calculated rotational speeds to produce new machine information for each machine, for each machine, determining whether the stored machine information should be edited based on one or more of editing rules and user input, and if so, editing the stored machine information based on the new machine information, for each machine, producing calculated new measurement configurations based on one or more of the digital sensor data, the frequency spectrums and the calculated rotational speeds, the new measurement configurations including one or more of alert limits and waveform acquisition settings, and for each machine, determining whether the stored measurement configurations should be updated based on one or more of comparison rules and user input, and if so, editing the stored measurement configurations based on the new measurement configurations.

13. The apparatus of claim 12 wherein the analyzer is further programmed for running an analysis cycle comprising:

for each machine, evaluating the measured machine values against alert limits in the stored measurement configurations, and issuing an alert signal if one or more of the measured machine values exceeds one of the alert limits, for each machine determining the presence of machine faults based on one or more of the digital sensor data, the frequency spectrums, the measured machine values and the calculated rotational speeds, and if the presence of a machine fault is detected, issuing a machine fault recommendation, accepting or rejecting the machine fault recommendation based on user input or stored measurement configurations that require automatic acceptance of machine fault recommendations, and if the machine fault recommendation is accepted, issuing a signal based on the machine fault recommendation.

14. A method for collecting machine data comprising:

sensing machine parameters of a machine and generating sensor signals corresponding to the machine parameters;

converting the sensor signals into digital sensor data and storing the digital sensor data in a memory;

inputting stored setup information into a predictive maintenance database in a machine analyzer;

analyzing the digital sensor data to determine measured machine values of the machine;

calculating new setup information based on one or more of the digital sensor data and the measured machine values to produce new setup information; and selectively storing the new setup information in the predictive maintenance database based on one or more of user input and setup information replacement rules.

15. The method of claim 14 further comprising:

running an analysis cycle for the machine, comprising:

evaluating one or more of the measured machine values against the stored setup information and determining one or more current operating conditions of the machine based thereon, and issuing one or more signals based on and indicating one or more current operating conditions of the machine.

16. The method of claim 14 further comprising:

determining a frequency spectrum for the machine based on the digital sensor data and stored measurement configurations;

calculating the rotational speeds of the machine based on the digital sensor data to produce a calculated rotational speed for the machine; and analyzing the digital sensor data to determine measured machine values of the machine based on the digital sensor data and the calculated rotational speeds of each machine.

17. The method of claim 16 further comprising:

calculating new setup information based on one or more of the digital sensor data, the frequency spectrum and the calculated rotational speed to produce new setup information for each machine, and determining whether the stored setup information should be edited based on one or more of editing rules and user input, and if the stored setup information should be edited, editing the stored setup information based on the new setup information.

18. The method of claim 14 wherein the step of analyzing the digital sensor data to determine measured machine values of the machine further comprises:

determining a frequency spectrum for the machine based on the digital sensor data and stored measurement configurations for the machine;

calculating the rotational speed of the machine based on the digital sensor data to produce a calculated rotational speed for the machine; and calculating new measured machine values for the machine based on one or more of the digital sensor data, the frequency spectrums and the calculated rotational speed, and storing the new measured machine values in the predictive maintenance database.

19. The method of claim 18 wherein the steps of calculating and storing the new setup information comprise:

calculating new machine information based on one or more of the digital sensor data, the frequency spectrums and the calculated rotational speed to produce new machine information, determining whether the stored machine information should be edited based on one or more of editing rules and user input, and if so, editing the stored machine information based on the new machine information, producing calculated new measurement configurations based on one or more of the digital sensor data, the frequency spectrums and the calculated rotational speeds, the new measurement configurations including one or more of alert limits and waveform acquisition settings, and determining whether the stored measurement configurations should be updated based on one or more of comparison rules and user input, and if so, editing the stored measurement configurations based on the new measurement configurations.

* * * * *